(12) United States Patent
Klingston et al.

(10) Patent No.: US 12,479,251 B2
(45) Date of Patent: Nov. 25, 2025

(54) REAR LOWER ISOLATOR

(71) Applicant: FCA US LLC, Auburn Hills, MI (US)

(72) Inventors: Zachary D Klingston, Oxford, MI (US); Nathan J Kellaway, Linden, MI (US); Richard R Churay, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/434,036

(22) Filed: Feb. 6, 2024

(65) Prior Publication Data

US 2025/0249720 A1  Aug. 7, 2025

(51) Int. Cl.
*B60G 11/16* (2006.01)

(52) U.S. Cl.
CPC ..................... *B60G 11/16* (2013.01)

(58) Field of Classification Search
CPC .... B60G 2204/12422; B60G 2204/124; B60G 11/16
See application file for complete search history.

(56) References Cited

U.S. PATENT DOCUMENTS

| | | | |
|---|---|---|---|
| 5,368,107 A | 11/1994 | Taomo | |
| 6,149,171 A | 11/2000 | Bono et al. | |
| 6,254,072 B1 | 7/2001 | Bono et al. | |
| 7,500,688 B2 | 3/2009 | Mullican et al. | |
| 8,616,538 B2 | 12/2013 | Al-Dahhan et al. | |
| 10,160,278 B2 | 12/2018 | Coombs et al. | |
| 10,336,147 B2 | 7/2019 | Miwa et al. | |
| 10,495,170 B2 | 12/2019 | Love et al. | |
| 2009/0134596 A1 | 5/2009 | Takahashi et al. | |
| 2012/0292876 A1* | 11/2012 | Koide | B60G 11/16 280/124.179 |
| 2016/0107497 A1 | 4/2016 | Paulding et al. | |
| 2016/0121674 A1 | 5/2016 | Cha | |
| 2016/0333956 A1* | 11/2016 | Teichmann | F16F 1/126 |
| 2022/0227193 A1* | 7/2022 | Duffau | B60G 15/063 |

FOREIGN PATENT DOCUMENTS

| | | | | |
|---|---|---|---|---|
| CN | 101413562 A | * | 4/2009 | ............. B60G 11/15 |
| EP | 2768719 B1 | | 5/2017 | |
| FR | 3002996 A1 | * | 9/2014 | ............. B60G 11/16 |
| JP | 6190651 B2 | | 8/2017 | |
| JP | 2022117637 A | | 8/2022 | |
| KR | 101887390 B1 | * | 8/2018 | |

(Continued)

OTHER PUBLICATIONS

Kim et al., Spring pad with steel insert, Aug. 10, 2018, KR, KR 101887390B1, Machine Translation of Description (Year: 2018).*

(Continued)

*Primary Examiner* — James A English
(74) *Attorney, Agent, or Firm* — Jeremy J. Klobucar

(57) ABSTRACT

A spring rear isolator has a base to couple the isolator with a suspension module. A spring seat, coupled with the base, has an index pilot hub to receive a pig tail end of a coil spring. The index pilot hub has an overall circular cylindrical shape with a lobe that peripherally extends from a portion of the cylinder. The lobe fixes position of the coil spring in the spring seat. The index pilot hub extends axially from the base into a second revolution of the coil spring.

18 Claims, 4 Drawing Sheets

(56) References Cited

FOREIGN PATENT DOCUMENTS

Figure 1:
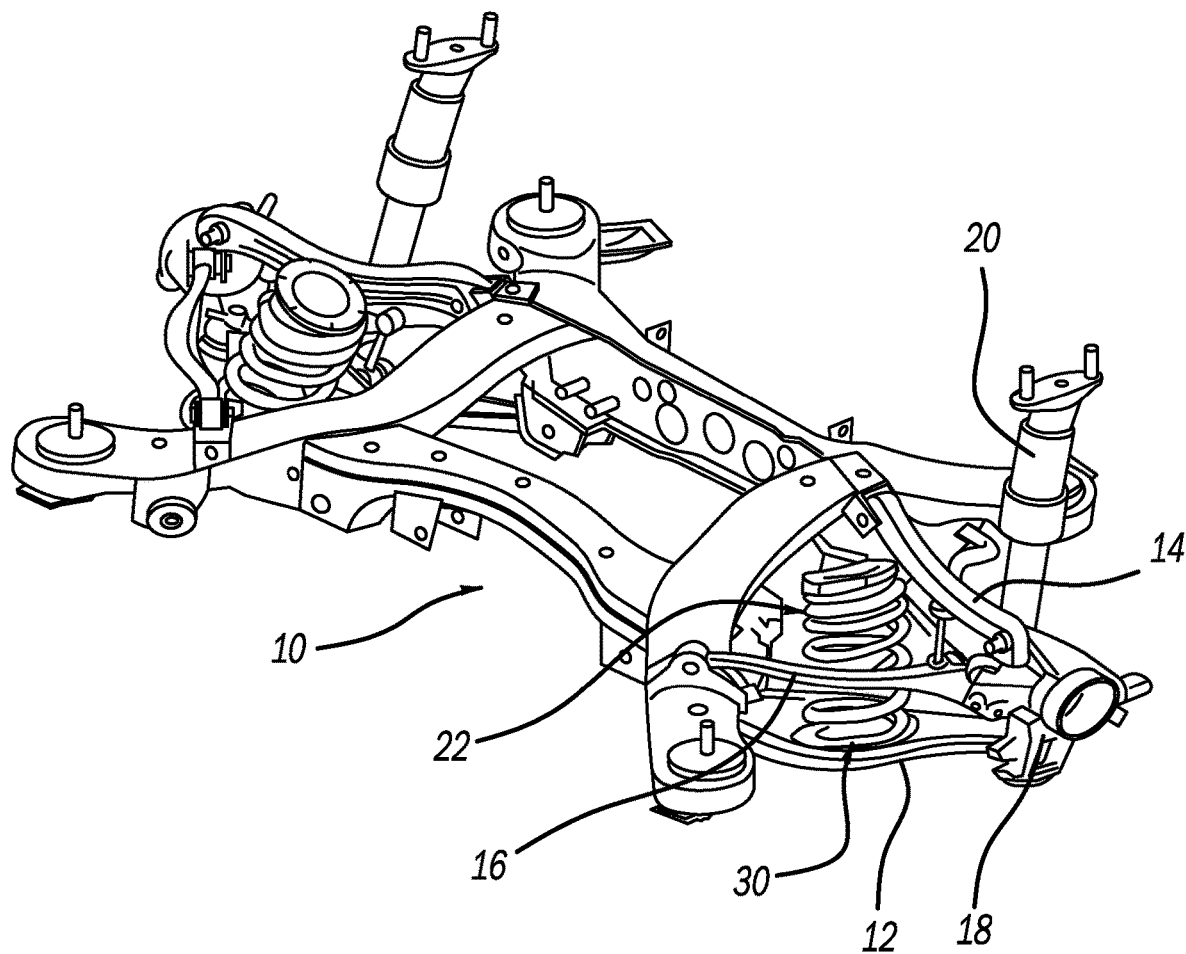

KR      1020240001732 A  *  1/2024
WO      2018/081248 A1     5/2018

OTHER PUBLICATIONS

Germano et al., Support for a screw compression spring, Apr. 22, 2009, CN, CN 101413562 A, Machine Translation of Description (Year: 2009).*

Lionnel Balay, Cup and Its Retaining Element on a Helical Spring, Sep. 12, 2014, FR, FR 3002996 A1, Machine Translation of Description (Year: 2014).*

* cited by examiner

REAR LOWER ISOLATOR

FIELD

The present disclosure relates to vehicle suspensions and, more particularly, to a rear lower spring isolator.

BACKGROUND

This section provides background information related to the present disclosure which is not necessarily prior art.

A rear lower spring isolator is part of the rear suspension module assembled as a subassembly of the coil spring module that includes an upper spring locator that seats to the body pilot. The coil spring is retained between the upper and lower isolator that clips into the spring link.

Generally, this assembly is shipped to an assembly plant to be assembled onto the lower control arm before decking. The design does not provide a mechanical method to control the coil end position that relies upon a skilled operator to guide and visually sort the coil spring modules onto the suspension. Thus, it is desirable to provide an assembly that overcomes the deficiency of the prior art.

If the spring assembly is not applied properly to the decking, unclocking from the center axis or coil stop during the manufacturing steps may occur. If the spring assembly becomes unclocked from the coil stop, the spring center line can become off axis from the center line of the assembly. An off axis portion of the coil spring may ride up on the center hub and unload the spring. Thus, the assembly enables an opportunity to misalign the spring on the isolator where the end is not properly positioned onto the isolator.

Accordingly, the present design overcomes the disadvantages of the prior art. The present design enables proper positioning of the pig tail end along the coil transition from a larger ID to a smaller ID of the spring body. The control of the transition fixes the spring without rotation of the spring about the pilot hub. The present design provides a helical rise design that has multiple advantages of keeping the spring seated onto the isolator. The present design provides a pilot hub that extends into a second revolution of the coil. The present design provides a retention outer wall for the pig tail. Additionally, the present design provides a vision check for an optical inspection to ensure that the spring is properly positioned.

SUMMARY

This section provides a general summary of the disclosure, and is not a comprehensive disclosure of its full scope or all of its features.

According to a first aspect of the disclosure, a coil spring rear isolator comprises a base coupling the isolator with a suspension module. A spring seat includes an index pilot hub to receive a pig tail end of the coil spring. The index pilot hub has an overall circular cylindrical shape with a lobe extending from a peripheral portion of the cylinder. The lobe provides a fixing position of the coil spring in the spring seat. The index pilot hub extends axially from the base into a second revolution of the coil spring. The spring retention system includes a plurality of tabs extending from the index hub to retain the pig tail. A stop ensures proper seating of the pig tail end on the index pilot hub. A detection rest prohibits the pig tail contact with remaining revolutions of the spring during compression of the spring. The base includes a retaining wall to center the pig tail end. The base is of a hard plastic material such as nylon. The spring seat is of an elastomeric material such as hard rubber. The spring seat includes a ramp to receive a portion of the spring pig tail. The base includes a reinforcement wall adjacent the ramp.

According to a second aspect of the disclosure, a vehicle suspension module comprises a spring link or lower control arm including an isolator. The isolator has a base secured to the lower control arm. A spring seat includes an index pilot hub to receive a pig tail end of the coil spring. The index pilot hub has an overall circular cylindrical shape with a lobe extending from a peripheral portion of the cylinder. The lobe provides a fixing position of the coil spring in the spring seat. The index pilot hub extends axially from the base into a second revolution of the coil spring. The spring retention system includes a plurality of tabs extending from the index hub to retain the pig tail. A stop ensures proper seating of the pig tail end on the index pilot hub. A detection rest prohibits the pig tail contact with remaining revolutions of the spring during compression of the spring. The base includes a retaining wall to center the pig tail end. The base is of a hard plastic material such as nylon. The spring seat is of an elastomeric material such as hard rubber. The spring seat includes a ramp to receive a portion of the spring pig tail. The base includes a reinforcement wall adjacent the ramp.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
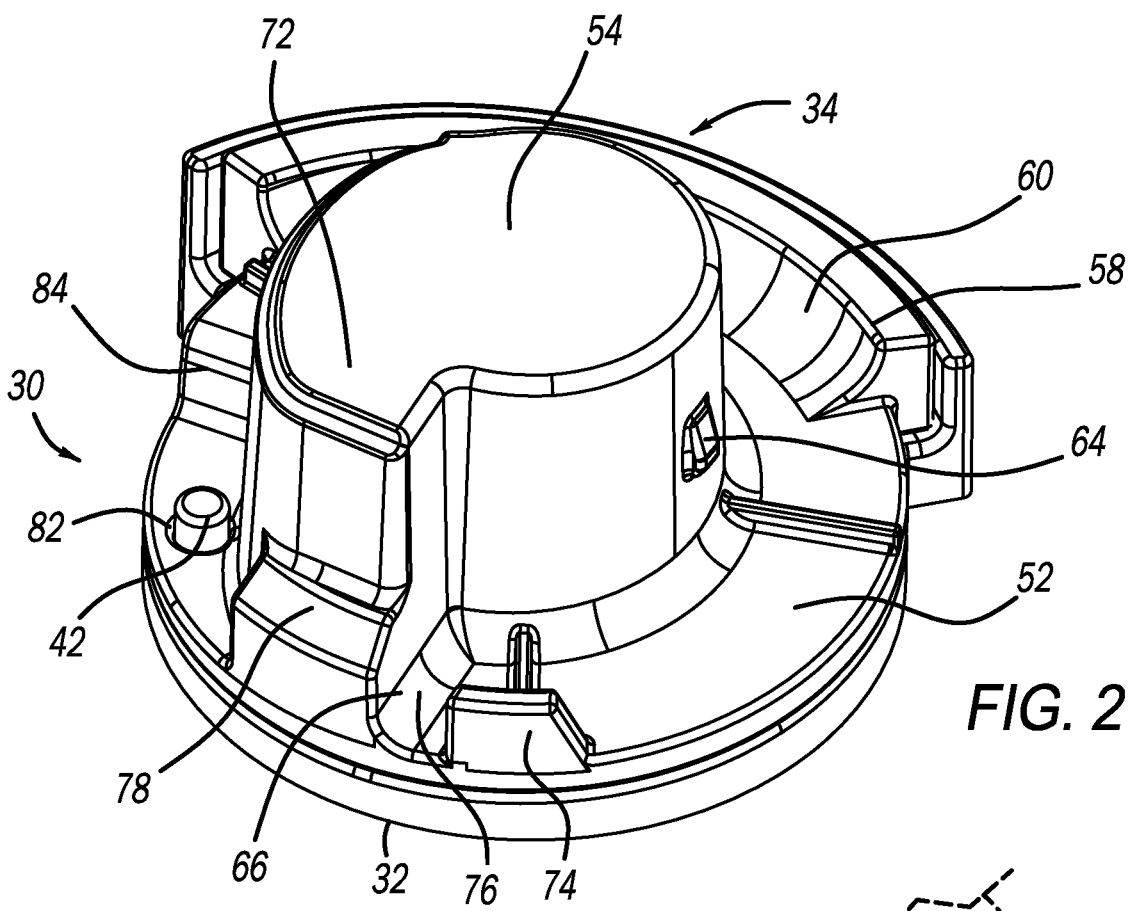
Figure 3:
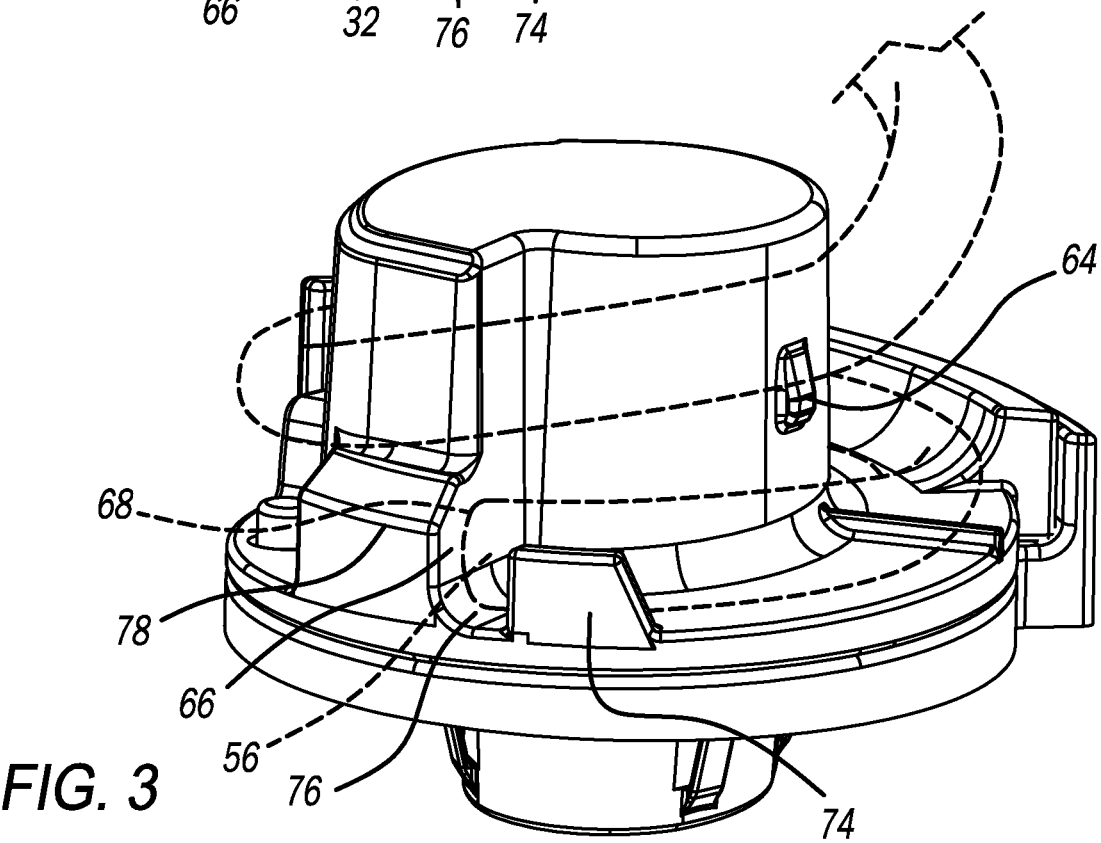
Figure 4:
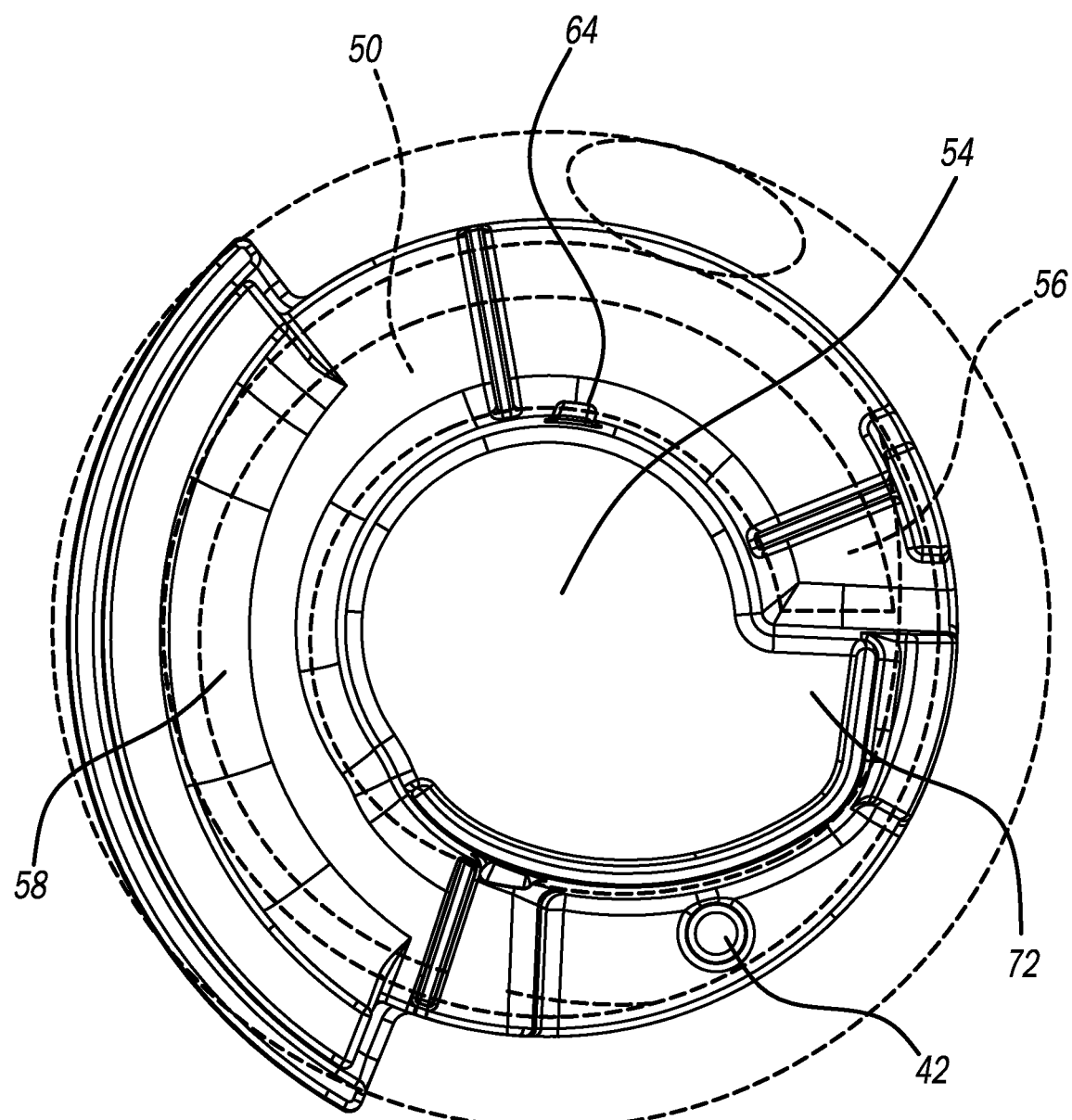
Figure 5:
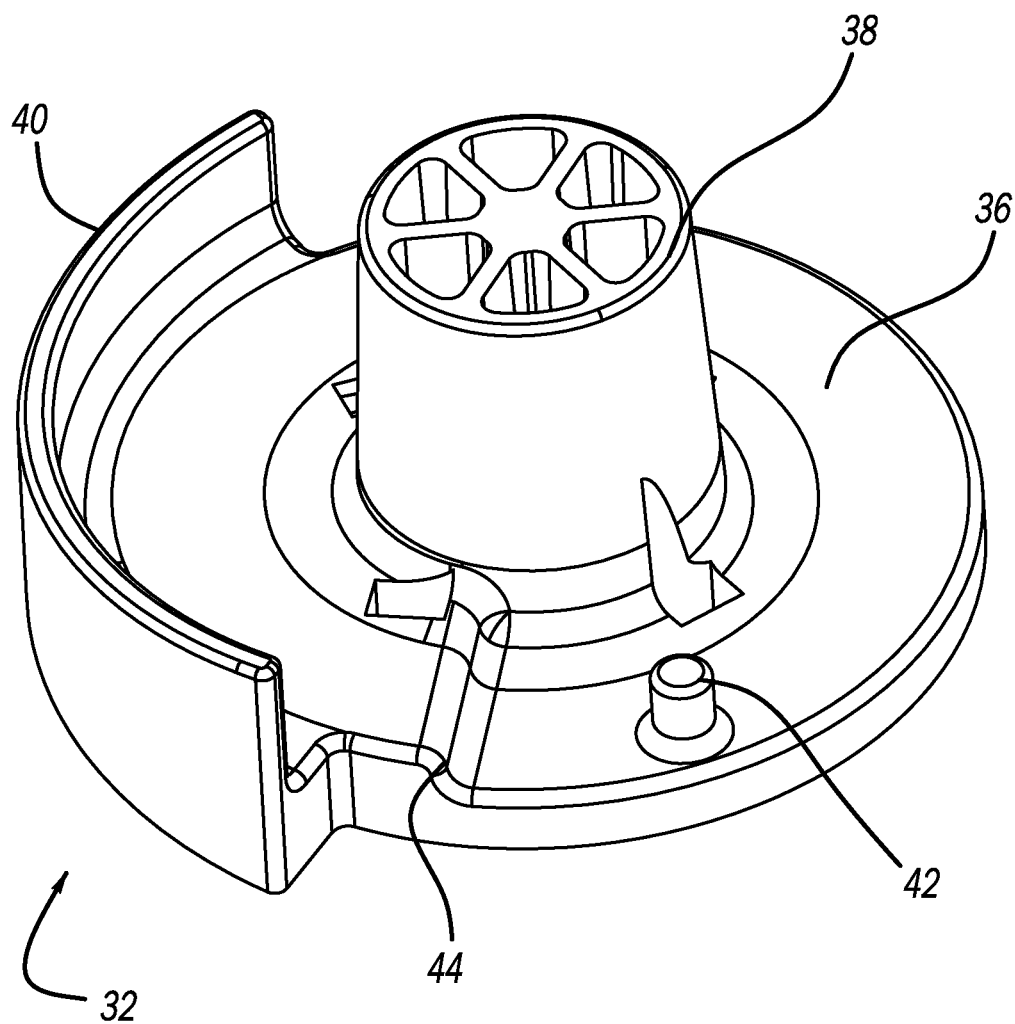

FIG. 1 is a schematic view of a vehicle suspension.
FIG. 2 is a perspective view of a rear coil spring isolator.
FIG. 3 is a perspective elevation view of the isolator with a coil spring.
FIG. 4 is a plan view of the isolator with a coil spring.
FIG. 5 is an exploded perspective view of the isolator.
Corresponding reference numerals indicate corresponding parts throughout the several views of the drawings.

DETAILED DESCRIPTION

Example embodiments will now be described more fully with reference to the accompanying drawings.

Turning to the figures, a suspension module is illustrated and designated with the reference number 10. The suspension module 10 includes control arms 12 along with links 14, 16 that support a knuckle assembly 18. Additionally, a shock absorber 20 is secured with the control arm 12. A spring assembly 30 is seated onto the control arm 12. The spring assembly 22 is retained on the control arm 12 by a spring isolator 30.

The spring isolator 30 includes a base 32 and a spring seat 34. The base 32 fits inside of the spring seat 34 and is generally glued together with the spring seat 34 to provide the isolator 30. The base 32 includes a body 36 to receive the spring seat 34. The body 36 includes a projecting hub 38 that inserts into a hollow portion of the spring seat 34. Also, the body 36 includes a projecting ramp 46. A retention wall 40 is on a peripheral edge of the body 36. Additionally, the base 32 includes a positioning pin 42 as well as a ramp stop 44 to enhance positioning of the spring seat 34. The base 32 is generally manufactured from a hard plastic material such as nylon to provide the isolator 30 with the requisite strength and reinforcement necessary to retain the coil spring 50.

The spring seat 34 includes a body 52 with a hollow projecting index pilot hub 54. The body 52 has an annular disk shape and rest on the base body 36. The spring seat 34 includes a ramp 58, seated on body ramp 46, that receives a portion of the pig tail coil 56 of the spring 50. The ramp 58 has a concave surface 60 to receive the pig tail portion 56 of the spring 50. The ramp 58 increases in height as it angles away from the base body ramp 46 as it continues circumferentially about the body 52. The ramp 58 is positioned against the retention wall 40 to provide reinforcement and retention of the pig tail 56 in the isolator 30.

The index hub 54 includes a lobe 72 on a peripheral surface of the index pilot hub 54. The lobe 72 projects away from the cylinder to provide an overall comma appearance when viewed in a top plan view as illustrated in FIG. 4. The lobe 72 contacts the coil spring 50 eliminating space between the hub 54 and the coil spring 50 as illustrated in FIG. 4 to prohibit debris from settling on the isolator 30.

The hub 54 also includes a retention system 62 that includes a plurality of tabs 64 that retain the pig tail portion 56 on the spring seat 34. The tabs 64 bend from the pilot hub so that the spring pig tail 56 is retained in position on the hub 54 and, in turn, isolator 30. A stop 66 abuts the terminal end 68 of the pig tail portion 56. This clocks the spring 50 onto the isolator 30. Thus, this positions the isolator 30 and coil spring 50 with respect to one another.

The index hub 54 extends a desired distance from the body 52. The distance is generally between 12-19 mm so that a second revolution of the coil spring is positioned about the index hub 54 as illustrated in FIG. 3.

Also, the spring seat 34 includes an end stop visual plate 74. The visual plate 74 is on the periphery of the body near the stop 66. A gap 76 is formed between the stop visual plate 74 and the stop 66. Thus, when the pig tail portion 56 abuts the stop 66, as illustrated in FIG. 3, its end 68 can be viewed by a laser or the like to determine that the spring 50 is in proper position on the isolator 30. If during the visual check or inspection, if a beam break occurs, the laser or the like would not sense a reflection off the reflective coating of the spring and thus, the inspection would fail due to the fact that spring 50 was not in a proper position.

A coil rest 78 extends from the body 52. The coil rest 78 provides a surface to prohibit contact of the revolutions of the coil spring 50 from contacting the pig tail portion 56 positioned in the spring seat 34. The coil rest 78 prohibits movement and contact of the successive coils when the coil spring 50 compresses as illustrated in FIG. 3. The coil rest 78 extend above the pigtail portion 56 so that the contact does not occur.

The spring seat 34 includes an aperture 82 that receives the positioning pin 42 of the base 32. Thus, this positions the spring seat onto the base. Additionally, the spring seat 34 includes a step 84 that abuts the ramp stop 44 at the end of ramp 46 to likewise enhance the positioning of the spring seat 34 onto the base 32.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A spring rear isolator comprising:
   a base for coupling the isolator with a suspension;
   a spring seat including a plate configured to mate with the base and having an axially outwardly extending index pilot hub for receiving a pig tail end of a coil spring, the index pilot hub having an overall circular cylindrical shaped cylinder with a lobe extending from a peripheral portion of the cylinder and defining a stop that is configured to abut a terminal end of the pig tail end, wherein the lobe fixes a position of the coil spring in the spring seat; and
   the index pilot hub axially outwardly extending from the base through a second revolution of the coil spring and defining a height relative to the plate, and the stop extends along an entirety of the height of the index pilot hub.

2. The spring rear isolator of claim 1, further comprising a spring retention system including a plurality of tabs extending from the index hub.

3. The spring rear isolator of claim 1, further comprising a stop visual plate to ensure proper seating of the pig tail end.

4. The spring rear isolator of claim 1, further comprising a detection rest for prohibiting pig tail contact with the remaining spring revolution during compression.

5. The spring rear isolator of claim 1, wherein the base includes a retaining wall for centering the pig tail end.

6. The spring rear isolator of claim 1, wherein the base is formed of a hard plastic.

7. The spring rear isolator of claim 1, wherein the spring seat is formed of an elastomeric material.

8. The spring rear isolator of claim 1, wherein the spring seat includes a ramp for receiving a portion of the spring pig tail.

9. The spring rear isolator of claim 8, wherein the base includes a reinforcement wall adjacent the ramp.

10. A vehicle suspension comprising:
    a spring assembly including an isolator;
    a suspension link or lower control arm;
    the isolator comprising:
    a base for coupling the isolator with the suspension;
    a spring seat including a plate configured to mate with the base and having an axially outward extending index pilot hub for receiving a pig tail end of a coil spring, the index pilot hub having an overall circular cylindrical shaped cylinder with a lobe extending from a peripheral portion of the cylinder and defining a stop that is configured to abut a terminal end of the pig tail end, wherein the lobe fixes a position of the coil spring on the spring seat; and
    the index pilot hub axially outwardly extending from the base through a second revolution of the coil spring and defining a height relative to the plate, and the stop extends along an entirety of the height of the index pilot hub.

11. The vehicle suspension of claim 10, further comprising a spring retention system including a plurality of tabs extending from the index hub.

12. The vehicle suspension of claim 10, further comprising a stop visual plate to ensure proper seating of the pig tail end.

13. The vehicle suspension of claim 10, further comprising a deflection rest for prohibiting pig tail contact with the remaining spring revolutions during compression.

14. The vehicle suspension of claim 10, wherein the base includes a retaining wall for centering the pig tail end.

15. The vehicle suspension of claim 10, wherein the base is of a hard plastic such as nylon.

16. The vehicle suspension of claim 10, wherein the spring seat is of an elastomeric material.

17. The vehicle suspension of claim 10, wherein the spring seat includes a ramp for receiving a portion of the spring pig tail.

18. The vehicle suspension of claim 17, wherein the base includes a reinforcement wall adjacent the ramp.

\* \* \* \* \*